(12) United States Patent
Eversole

(10) Patent No.: US 11,768,010 B2
(45) Date of Patent: Sep. 26, 2023

(54) CONFIGURABLE ANIMAL HOUSE CEILING VENT

(71) Applicant: The GSI Group, LLC, Assumption, IL (US)

(72) Inventor: Nathan Robert Eversole, Assumption, IL (US)

(73) Assignee: The GSI Group LLC, Assumption, IL (US)

( * ) Notice: Subject to any disclaimer, the term of this patent is extended or adjusted under 35 U.S.C. 154(b) by 230 days.

(21) Appl. No.: 17/231,540

(22) Filed: Apr. 15, 2021

(65) Prior Publication Data
US 2021/0325079 A1 Oct. 21, 2021

Related U.S. Application Data

(60) Provisional application No. 63/010,801, filed on Apr. 16, 2020.

(51) Int. Cl.
| | | |
|---|---|---|
| *A01K 1/00* | (2006.01) | |
| *F24F 13/14* | (2006.01) | |
| *F24F 13/08* | (2006.01) | |
| *F24F 7/02* | (2006.01) | |

(52) U.S. Cl.
CPC ........ *F24F 13/1426* (2013.01); *A01K 1/0058* (2013.01); *F24F 7/02* (2013.01); *F24F 13/084* (2013.01); *F24F 13/142* (2013.01); *F24F 2013/1453* (2013.01)

(58) Field of Classification Search
CPC ........ A01K 1/0058; F24F 7/02; F24F 13/142; F24F 13/1426; F24F 13/084; F24F 2013/1453

USPC .......................................................... 454/220
See application file for complete search history.

(56) References Cited

U.S. PATENT DOCUMENTS

| | | | | |
|---|---|---|---|---|
| 3,299,798 | A * | 1/1967 | Nabben ..................... | F24F 7/00 454/259 |
| 5,989,119 | A * | 11/1999 | Raisanen .............. | A01K 1/0058 454/270 |
| 8,827,781 | B2 * | 9/2014 | Aderman ............. | A01K 1/0058 454/348 |

(Continued)

*Primary Examiner* — Avinash A Savani
*Assistant Examiner* — Dana K Tighe

(57) ABSTRACT

A ceiling vent assembly incudes a ceiling vent having a pair of opposed end panels and a pair of opposed side panels, which define a frame that is open at its top and bottom. The frame receives two louvers pivotally mounted so as to be movable between open and closed positions. The ceiling vent assembly also includes first and second cables attached to the first and second louvers and a pulley assembly having a pair of vertically-oriented pulleys and a center pulley block having at least one horizontal pulley. The horizontal pulley has two vertically offset cable guides. Control rods pass through aligned rod openings in the end panels and pulley block. The pulley block has cable routing holes adjacent to each of the cable guides. The first cable is routed from the first louver, around the first vertical pulley, around one of the cable guides and then to one of the control rods, and the second cable is routed from the second louver, around the second vertical pulley, around the other one of the cable guides and then to one of the control rods such that the cables can be selectively routed so that the louvers can be controlled by either one of the control rods.

17 Claims, 7 Drawing Sheets

(56) References Cited

U.S. PATENT DOCUMENTS 10,638,719 B1 * 5/2020 Streicher ................ A01K 31/22
11,131,478 B1 * 9/2021 Tabor .................. F24F 13/1413

* cited by examiner

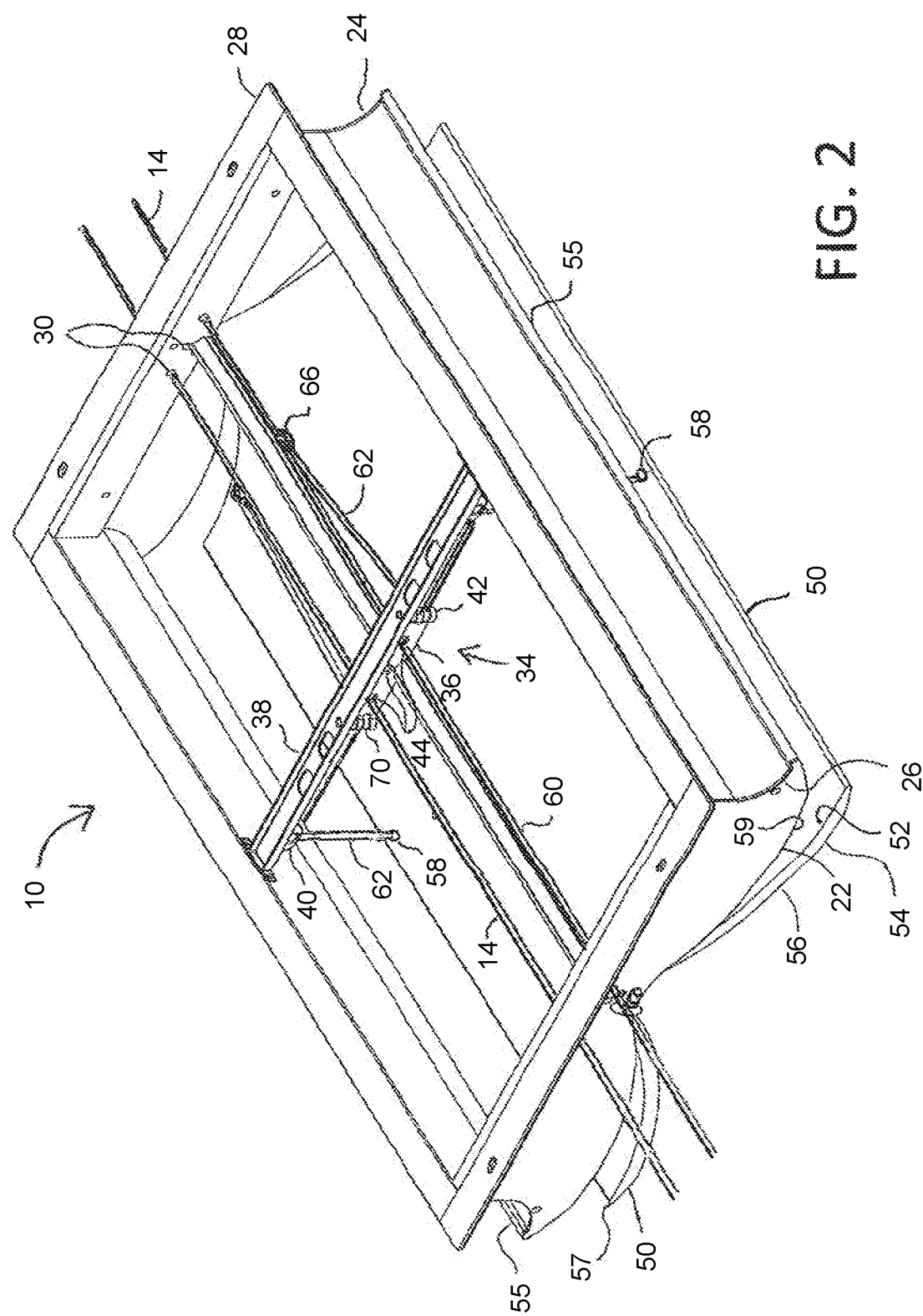

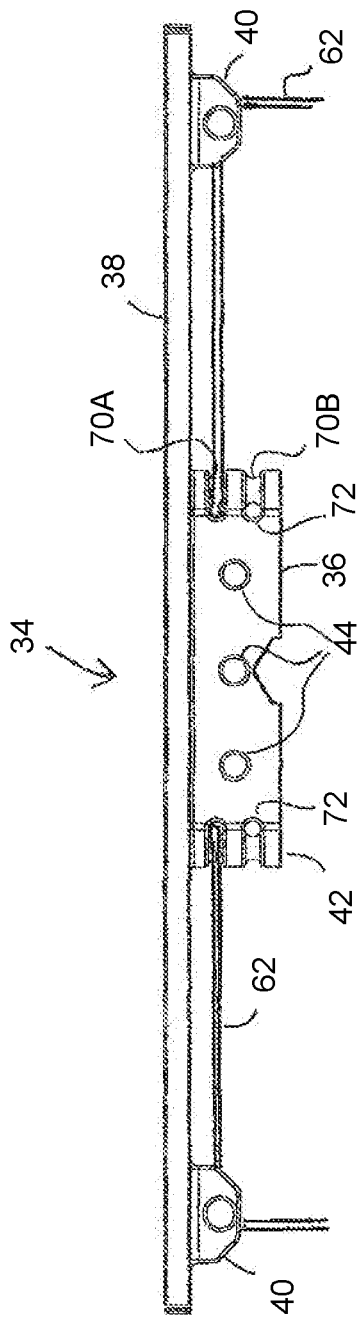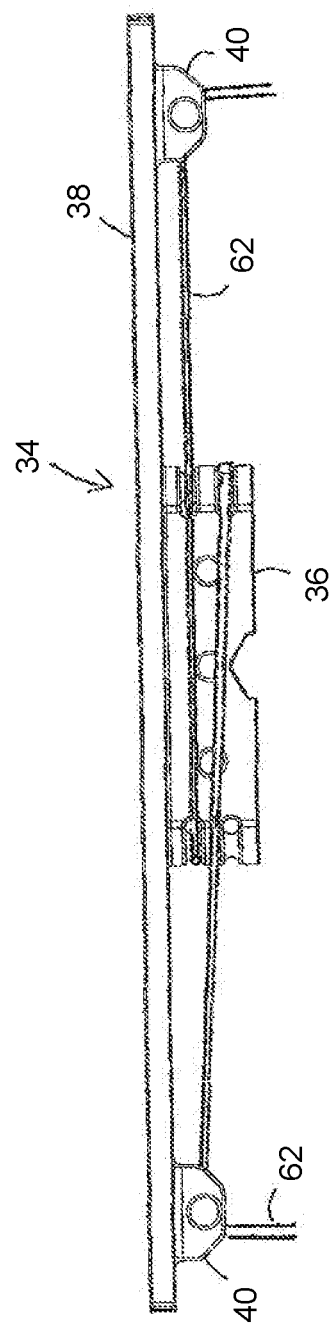

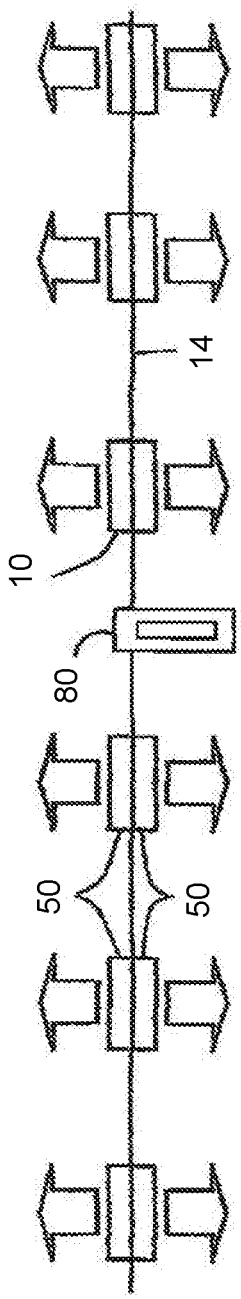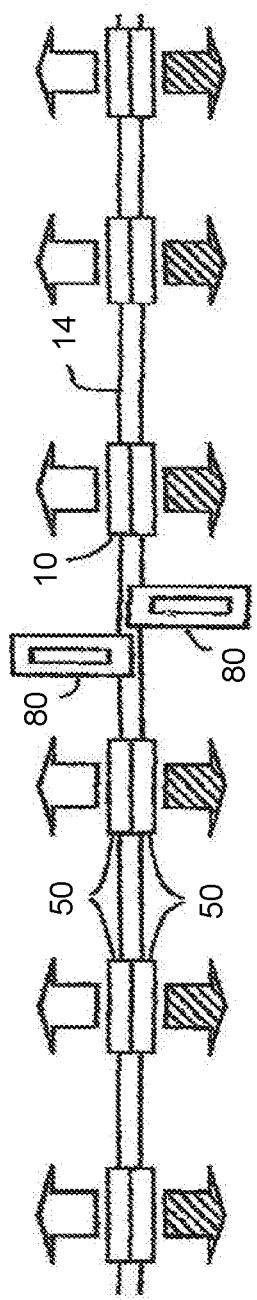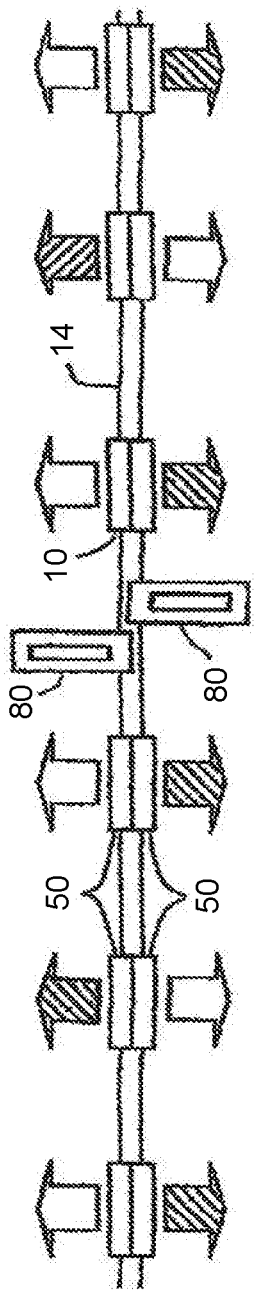

CONFIGURABLE ANIMAL HOUSE CEILING VENT

CROSS REFERENCE TO RELATED APPLICATION

This application claims the benefit of U.S. Provisional Application No. 63/010,801, filed Apr. 16, 2020, which is hereby incorporated by reference in its entirety.

BACKGROUND OF THE INVENTION

Field of Invention

This disclosure relates to ceiling vents, and, in particular, to a ceiling vent for use in animal houses.

Description of Related Art

Vents are often used as part of the ventilation system for an animal house (such as a poultry house). The vents are generally located in the roof, ceiling, or sidewalls of the animal house. Each vent contains louvers or blades which are moved from a closed position and an open position. In the open position, the vent will allow fresh air to enter the animal house to help ventilate the animal house.

The louvers of ceiling vents typically move to an open position by force of gravity and moved to a closed position by pulling a cable. The cables for the various ceiling vents can be operated by one or more control rods so that a number of ceiling vents can be opened or closed together using a single actuator. Up until know, there have been limited ways the ceiling vents can be configured limiting the options to open and close the louvers. This does not always provide for efficient flow and circulation of air within the animal house. It would be beneficial to provide a ceiling vent which is more configurable in how it directs the air which enters the animal house.

BRIEF SUMMARY OF THE INVENTION

Briefly stated, in one aspect the invention is directed to a ceiling vent assembly for use in a ceiling of an animal house. The ceiling vent assembly incudes a pair of control rods. The ceiling vent assembly also includes a ceiling vent having a pair of opposed end panels and a pair of opposed side panels, which, in combination, define a frame that is open at its top and bottom. The frame receives a first louver and a second louver pivotally mounted in the frame so as to be movable between an open position in which airflow passes through the ceiling vent and a closed position in which airflow is blocked from passing through the ceiling vent. The end panels each have a plurality of rod openings with one of the plurality of rod openings from each of the end panels forming an aligned pair of rod openings. The ceiling vent assembly also includes a first cable attached to the first louver and a second cable attached to the second louver. The ceiling vent assembly also includes a pulley assembly having a pair of vertically-oriented pulleys and a center pulley block having at least one horizontal pulley. The at least one horizontal pulley has a first cable guide and a second cable guide with the first cable guide being offset vertically with respect to the second cable guide. The pulley block has a plurality of rod openings with one of the plurality of rod openings in the pulley block aligned with one of the aligned pairs of rod openings in the end panels, such that one of the control rods may pass through the aligned rod openings in the end panels and pulley block. The pulley block has cable routing holes 72 adjacent to each of the cable guides. The first cable is routed from the first louver, around the first vertical pulley, around one of the cable guides and then to one of the control rods, and the second cable is routed from the second louver, around the second vertical pulley, around the other one of the cable guides and then to one of the control rods such that the cables can be selectively routed so that the first and second louvers can be controlled by either one of the two control rods depending on which control rod the cable is attached. This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 2 is a perspective view of one of the ceiling vents of FIGS. 1A and 1B;

FIG. 4A is an elevation view of the pulley assembly of FIG. 3 with a cable routed in a first configuration;

FIG. 4B is an elevation view of the pulley assembly of FIG. 3 with a cable routed in a second configuration;

FIG. 7A is a schematic view showing all of the louvers of the series of ceiling vents in an open position;

FIG. 7B is a schematic view showing the louvers on one side of the series of ceiling vents in an open position as can be controlled by routing all of the cables such as in the first configuration of FIG. 4A; and FIG. 7C is a schematic view showing alternating louvers on sides of the series of ceiling vents in an open or closed position as can be controlled such as by routing the cable of the alternating ceiling vents in the second configuration of FIG. 4B.

Corresponding reference characters indicate corresponding parts throughout the several views of the drawings.

DESCRIPTION OF PREFERRED EMBODIMENTS

Figures 1A, 1B:
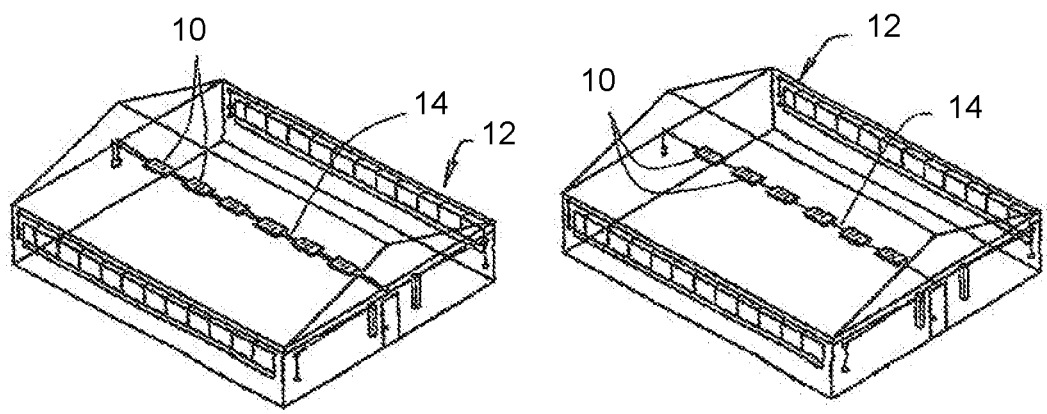
FIG. 1A is a schematic view of an animal house having a series of ceiling vents configured to be operated with a plurality of control rods.
FIG. 1B is a schematic view of an animal house having a plurality of ceiling vents configured to be operated with a single of control rod.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Turning now to the drawings, FIG. 1A schematically shows a series of ceiling vents 10 mounted in a ceiling (removed for clarity) of an animal house 12. At least one control rod 14 extends between the ceiling vents so that a plurality of the ceiling vents 10 can be opened or closed together. In FIG. 1A, first and second control rods 14 are provided, each of the control rods 14 configured to selectively move a respective portion of louvers of the ceiling vents 10 between their open and closed positions as will be described in more detail below. FIG. 1B illustrates a similar animal house 12 with the series of ceiling vents 10 controlled by a single control rod 14 extending to the ceiling vents 10. In this case, the louvers of each ceiling vent 10 will open or close together. That is, when the single control rod 14 is actuated, the louvers of all the ceiling vents 10 will move together between the opened position and the closed position.

Turning now to FIG. 2, the ceiling vent 10 has a pair of opposed end panels 22 and a pair of opposed side panels 24, which, in combination, define a frame 26 that is open at its top and bottom. As seen, the frame 26 is generally quadrilateral in shape. The frame 26 may be made from a variety of materials, including metal and/or plastic. The end panels 22 and side panels 24 can be independent pieces which are assembled together to form the frame 26. Alternatively, the end panels 22 and side panels 24 of frame 26 can be a one-piece, unitary element of the ceiling vent 10. A flange 28 extends around the frame 26 near the top edges of the end and side panels 22 and 24. The flange 28 may function as a mounting flange which mates with a surface of a ceiling (not shown) in which the ceiling vent 10 is installed.

A plurality of rod openings 30 extends through each of the end panels 22. Each rod opening 30 in one end panel 22 has a corresponding rod opening 30 in the opposite end panel 22 such that the two rod openings 30 define a line which is generally parallel to the sidewalls 24. In the illustrated embodiment, there is a first pair of openings in a right portion of the end panels 22, a second pair of openings in a left portion of the end panels 22, and a third pair of rod openings 30 near a midpoint of the end panels 22. Although three pairs of rod openings 30 are shown in the illustrated embodiment, more or fewer openings could be used, if desired.

Figure 3:
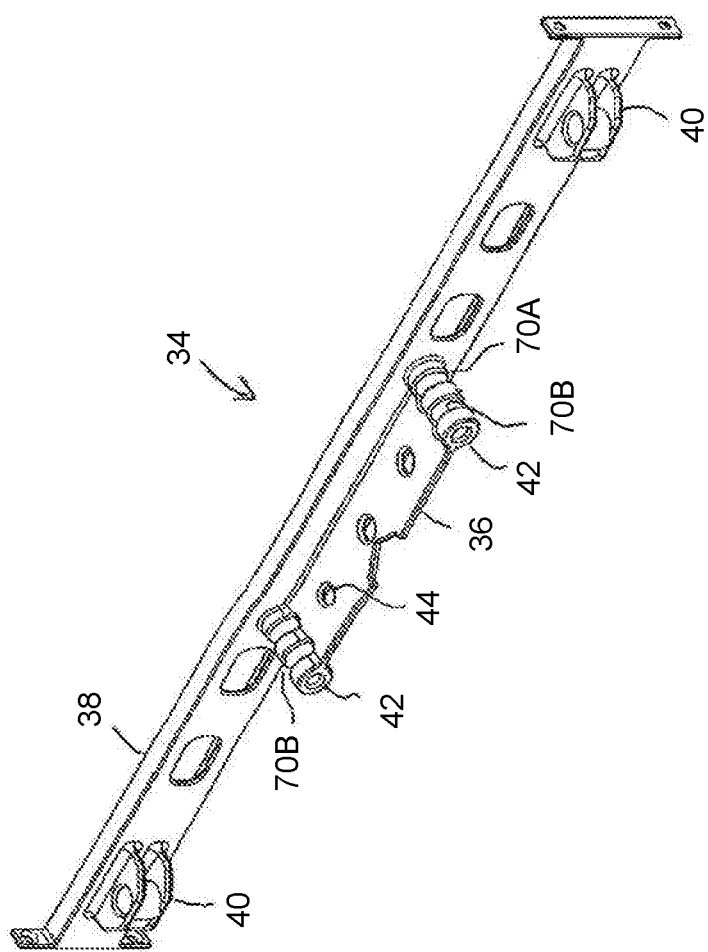
FIG. 3 is a perspective view of a pulley assembly of the ceiling vent of FIG. 2.

A pulley assembly 34 extends across the frame 26 between the side panels 24, generally at a mid-point along the length of the ceiling vent 10. The pulley assembly 34 includes a center pulley block 36 and a mounting bar 38 that is fixed to the side panels 24 in any desired manner, such as by gluing, welding, bolting, riveting, etc. Turning also now to FIG. 3, a vertically-oriented pulley 40 is spaced inwardly from each end of the mounting bar 38, with the vertical pulleys 40 extending downward from the mounting bar 38. The pulley block 36 has a pair of horizontally-oriented pulleys 42 spaced outwardly from the center of the pulley block 36. The pulley block 36 has a plurality of rod openings 44, with each rod opening 44 generally aligned with one of the pairs of rod openings 30 in the end panels 22, such that one of the at least one control rods 14 may pass through the aligned rod openings 30, 44 in the ceiling vent 10. The horizontal pulleys 42 are formed in the pulley block 36 so that the horizontal pulleys 42 are suspended beneath the mounting bar 38.

A pair of doors or louvers 50 is pivotally mounted in the frame 26. The louvers 50 are desirably identical and extend between the end panels 22. Each louver 50 has an upper surface 52 and a lower surface 54. The louver upper surface 52 defines a continuous curve from the inner edge to the outer edge of the louver 50. The curvature of the upper surface 52 conforms to the curvature of shoulder segments 55 on the inside surface of each side panel 24. The louver bottom surface 54 defines a curved portion 56 which extends most of the length of the louver 50, such that, for most of the length of the louver 50, the louver is of generally constant width. However, the outer end of the bottom surface 54 slopes upwardly so that the louver 50 tapers (i.e., reduces in width) toward its outer edge 57, as best seen in FIG. 3. Lastly, the louver 50 includes a hole 58 at the approximate center (length-wise) of the louver 50. The pulley assembly 34 is mounted to the frame 26 to be vertically above the louver hole 58. In the closed position, the end edges of the louver upper surface 52 are received by shoulder segments 59 in the end panel 22 and the upper surface 52 abuts the bottom of the side panels 24 along the outer edge of the louver 50. In this manner, the louvers 50 seal against the frame 26 to substantially prevent air from passing through the ceiling vent 10 when the louvers 50 are in a closed position. If desired, a sealing material, such as a deformable foam or felt could be positioned on the louver upper surface 52 to ensure a tighter seal between the louver 50 and the frame 26.

When the ceiling vent 10 is opened (i.e., when the louvers 50 are lowered), air will pass downwardly through the ceiling vent 10 into the animal house 12. Due to the shape of the louvers 50 and the radiused bottom edge 55 of the side panels 24, the air passing through the ceiling vent 10 will not simply drop down in to the animal house 12. Rather, the shape of the louvers 50 and the radiused edge 55 of the side panels 24 will tend to force the air outwardly and slightly upwardly so that the air moves across the ceiling of the animal house 12 and then down side walls of the animal house 12. Additionally, air moving along the louver 50 will be directed in an arc defined by the curvature of the louver upper surface 52 against which the airflow passes.

The louver 50 is pivotally mounted in the frame 26 to be movable between an open position and a closed position. In one embodiment, the louvers 50 are pivotable by means of pivot pins (not shown) that extend from the opposite edges of the louvers 50 at inner ends 60 of the louvers. Thus, the louvers 50 pivot about their inner edges 60. The pins extend through the openings (not shown) in the end panels 22 and can be integral with the louvers 50, or can comprise rods or screws which extend through the openings into the end edge of the louver 50. The pins could be integrally formed with the end panels, and be received in holes in the edges of the louvers 50. However, one skilled in the art will understand that the louvers 50 may be pivotally mountable in the frame 26 through any means using sound engineering judgment.

The ceiling vent 10, as noted above, is mounted in a ceiling of the animal house 12 with the louvers 50 at the bottom of the ceiling vent 10, as seen in FIG. 2. The louvers 50 are moved to the open position under gravity. The louvers 50 can be closed by means of a cable, cord, rope or the like 62. The cable 62 will be connected to the louver 50 at one end, such as by extending through the louver hole 58 and being knotted on the bottom surface of the louver 50. The cable 62 will extend up from the louver 50, pass over the vertical pulley 40, around one of the horizontal pulleys 42 and to a position where it can connected to the control rod 14 with a cable clamp 66. The ceiling vent 10 desirably has two cables 62, one to operate each of the louvers 50.

According to the invention, each of the horizontal pulleys 42 of the pulley assembly 34 have a cable guide 70 that is offset from the cable guide 70 in the other horizontal pulley 42 so that the cables 62 used to operate the louvers 50 can be selectively routed through the pulley assembly 34 in multiple ways so that the series of vent assemblies 10 in the animal house 12 can be operated in customized manner. In the illustrated embodiment, each of the horizontal pulleys 42 of the pulley block 36 has a first cable guide 70A and a second cable guide 70B that is offset from the first cable guide 70A. The first cable guide 70A is in line with the second cable guide 70B such that they have a common axis but the first cable guide 70A is offset vertically with respect to the second cable guide 70B. Turning also now to FIGS. 4A and 4B, the pulley block 36 has cable routing holes 72 formed therein inwards of each of the cable guides 70A, 70B that may be used so that the cable 62 can be routed from the vertical pulley 40 to the cable clamp 66 on one of the control rods 14 such that it winds around one of the cable guides 70A or 70B in either the clockwise or the counter-clockwise direction.

For example, in FIG. 4A, the cable 62 operating the louver 50 on the left side of the ceiling vent 10 is routed from the louver 50, around the vertical pulley 40 on the left hand side of the pulley assembly 34, and through the cable routing hole 72 adjacent the first cable guide 70A in the horizontal pulley 42 in the left side of the pulley block 36 such that the cable 62 wraps around to the first cable guide 70A in the counter-clockwise direction and then to the control rod 14 that passes through the rod opening 44 on the left side of the ceiling vent 10. The cable 62 operating the louver 50 on the right side of the ceiling vent 10 is routed from the louver 50 on the right side, around the vertical pulley 40 on the right side of the pulley assembly 34, and through the cable routing hole 72 adjacent the first cable guide 70A in the horizontal pulley 42 in the right part of the pulley block 46 such that the cable 62 wraps around to the first cable guide 70A in the clockwise direction and then to the control rod 14 that passes through the rod opening 44 on the right side of the ceiling vent 10. For all of the ceiling vents 10 in the animal house 12 configured in this manner, the control rod 14 on the right side of the ceiling vents 10 opens and closes the louvers 50 in the right side of the ceiling vents 10 and the control rod 14 on the left side of the ceiling vents 10 opens and closes the louvers 50 in the left side of the ceiling vents 50. In this configuration, it doesn't matter whether the cables 62 are routed around the first cable guide 70A or the second cable guide 70B.

Alternately, in FIG. 4B, the cable 62 operating the louver 50 on the left side of the ceiling vent 10 is routed from the louver 50, around the vertical pulley 40 on the left hand side of the pulley assembly 34, across the face of the pulley block 36 to the second cable guide 70B in the horizontal pulley 42 in the right side of the pulley block 36, bypassing the cable routing hole 72 such that the cable 62 wraps around to the second cable guide 70A in the counter-clockwise direction, and then to the control rod 14 that passes through the rod opening 44 on the right side of the ceiling vent 10. The cable 62 operating the louver 50 on the right side of the ceiling vent 10 is routed from the louver 50, around the vertical pulley 40 on the right hand side of the pulley assembly 34, across the face of the pulley block 36 to the first cable guide 70A in the horizontal pulley 42 in the left side of the pulley block 36, bypassing the cable routing hole 72 such that the cable 62 wraps around to the first cable guide 70A in the clockwise direction, and then to the control rod 14 that passes through the rod opening 44 on the left side of the ceiling vent 10. For all of the ceiling vents 10 in the animal house 12 configured in this manner, the control rod 14 on the right side of the ceiling vents 10 opens and closes the louvers 50 in the left side of the ceiling vents 10 and the control rod 14 on the left side of the ceiling vents 10 opens and closes the louvers 50 in the right side of the ceiling vents 50. In this configuration, it doesn't matter whether the cables 62 are routed around the first cable guide 70A or the second cable guide 70B as long as one cable is routed around the first cable guide 70A and the other cable 62 is routed around the second cable guide 70B. Having the second cable guide 70B vertically offset from the first cable guide 70A allows the cables 62 to cross along the face of the cable block 36 without interfering with each other.

While the embodiment illustrated in FIGS. 4A and 4B shows the horizontal pulleys 42 each having two vertically offset cable guides 70A and 70B, it is contemplated that one horizontal pulley 42 can just have one cable guide in the vertical position of the first cable guide 70A and the other horizontal pulley 42 have just one cable guide in the vertical position of the second cable guide 70B such that the cable guides of the two horizontal pulleys 42 in the pulley block 36 are vertically offset. Having the cable guides 70A, 7B vertically offset allows the two cables 62 to still be routed across the face of the cable block 36 without interfering with each other and permit the two control rods 14 to be used to open and close the louvers 50 on the opposite side of the ceiling vent 10.

Figure 5A:
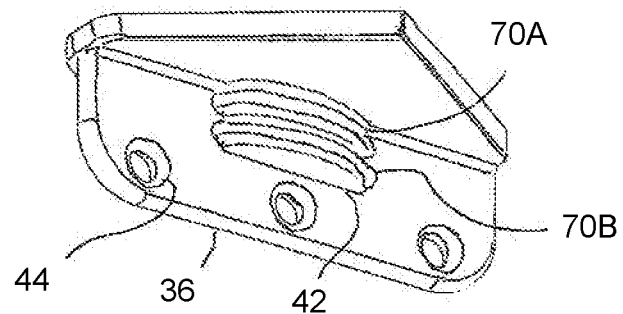
FIG. 5A is a perspective view of a pulley block of another embodiment of a pulley assembly of a ceiling vent of FIG. 1.
Figure 5B:
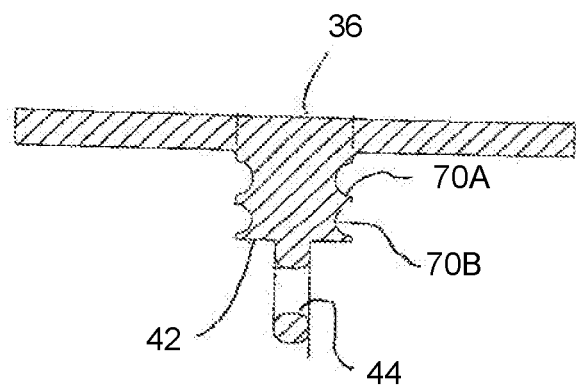
FIG. 5B is a sectional view of the pulley assembly of FIG. 4A.
Figure 6:
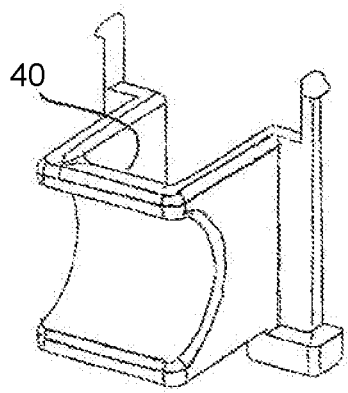
FIG. 6 is a perspective view of a vertical pulley of another embodiment of the pulley assembly of a ceiling vent of FIG. 1.

FIGS. 5A and 5B show an alternate embodiment of the pulley block 36 of the pulley assembly 34. In this embodiment, the pulley block 36 has a single horizontal pulley 42 having the first cable guide 70A and the second cable guide 70B that is offset from the first cable guide 70A. The first cable guide 70A is in line with the second cable guide 70B such that they have a common axis but the first cable guide 70A is offset vertically with respect to the second cable guide 70B. The pulley block 36 is attached to the mounting bar 38 that may be fixed to either the end panels 22 or side panels 24 in any desired manner, such as by gluing, welding, bolting, riveting, etc. Turning also now to FIG. 6, another embodiment of the vertically-oriented pulley 40 is shown that can be mounted directly to the side panel 24. The pulley block 36 has the same plurality of rod openings 44, with each rod opening 44 generally aligned with one of the pairs of rod openings 30 in the end panels 22, such that one of the at least one control rods 14 may pass through the aligned rod openings 30, 44 in the ceiling vent 10. The horizontal pulley 42 is formed in the pulley block 36 so that the horizontal pulley 42 is suspended beneath the mounting bar 38.

The pulley block 36 has cable routing holes 72 adjacent to and outward of both sides of each of the cable guides 70A, 70B that may be used so that the cable 62 can be routed from the vertical pulley 40, around one of the cable guides 70A, 70B and then to either one of the control rods 14. Accordingly, using this embodiment the cables 62 can be selectively routed so that the louver 50 can be controlled by either one of the control rods 14 depending on which control rod 14 the cable 62 is clamped to using cable clamp 66.

Thus the pulley assembly 34 permits the cables 62 to be routed in multiple configurations allowing the each of the ceiling vents 10 in the animal house 12 to be configured as desired. Turning now to FIGS. 7A-5C, FIG. 7A shows a configuration where there is a single control rod 14 and single actuator 80 that opens and closes both of the louvers 50 in each of the ceiling vents. This can be accomplished with the illustrated embodiment by routing the control rod 14 through the middle set of aligned rod openings 30, 44 and attaching the cable 62 leading from each louver 50 to the control rod 14 with a cable clamp 66.

FIG. 7B presents a set-up which uses two control rods 14 as shown in FIG. 1A. FIG. 7B shows the each of the louvers 50 on one side of the series of ceiling vents 10 in an open position and each of the louvers 50 on the opposite side of the series of ceiling vents 10 in a closed position. If the all of the cables 62 are routed in the pulley assemblies 34 as shown in FIG. 4A, one control rod 14 moved by a first actuator 80 controls the louvers 50 on one side of the ceiling vents 10 and the other control rod 14 and other actuator 80 controls the louvers 50 on the opposite side of the ceiling vents 10. In this set-up, all the right side louvers 50 open and close together and all the left side louvers 50 open and close together. However, the right side louvers 50 can be opened while the left side louvers 50 are closed, and vice versa. This configuration can be achieved by routing all of the cables 62 as shown in the configuration of FIG. 4A so that the louvers 50 are all controlled by the control rod 14 on the same side of the ceiling vent 10. In this configuration, the control rod 14 on the right side of the ceiling vents 10 opens and closes the louvers 50 in the right side of the ceiling vents 10 in the animal house 12 and the control rod 14 on the left side of the ceiling vents 10 opens and closes the louvers 50 in the left side of the ceiling vents 50.

FIG. 7C also presents a set-up which uses two control rods 14 as shown in FIG. 1A. In this set-up, the louvers 50 of each ceiling vent 10 open and close independently, as in the arrangement of FIG. 7B, however, the louvers 50 of adjacent ceiling vents 10 open and close in an alternating manner. That is, when the left louver is opened and the right louver is closed of one ceiling vent 10, the left louvers 50 are closed and the right louvers 50 are open of the two adjacent ceiling vents 10. This configuration can be accomplished by routing the pulley assembly 34 of one ceiling vent 10 as shown in FIG. 4B and the pulley assemblies 34 of the two adjacent ceiling vents 10 as shown in FIG. 4A. Thus, with a series of ceiling vents 10 having common pulley assemblies 34, selecting how the cables 62 are routed through the pulley assemblies 34 permits louvers 50 on alternating ceiling vents 10 in the series of ceiling vents 10 to be in the open and closed positions and controlled by the two control rods 14.

As various changes could be made in the above constructions without departing from the broad scope of the invention, it is intended that all matter contained in the above description or shown in the accompanying drawings shall be interpreted as illustrative and not in a limiting sense.

The invention claimed is:

1. A ceiling vent assembly for use in a ceiling of an animal house, the ceiling vent assembly comprising:
    a pair of control rods;
    a ceiling vent comprising a pair of opposed end panels and a pair of opposed side panels, which, in combination, define a frame that is open at its top and bottom, the frame receiving a first louver and a second louver, each louver being pivotally mounted in the frame so as to be movable between an open position in which the louver passes airflow through the ceiling vent and a closed position in which the louver blocks the airflow from passing through the ceiling vent, the end panels each having a plurality of rod openings with one of the rod openings from each of the end panels being aligned such that the rod openings form a plurality of aligned pairs of rod openings;
    a first cable attached to the first louver;
    a second cable attached to the second louver; and
    a pulley assembly comprising first and second vertical pulleys and a center pulley block having at least one horizontal pulley, the at least one horizontal pulley having a first cable guide and a second cable guide with the first cable guide being offset vertically with respect to the second cable guide, wherein the pulley block has a plurality of rod openings, with each one of the plurality of rod openings in the pulley block being aligned with one of the aligned pairs of rod openings in the end panels, such that one of the control rods passes through one set of aligned rod openings in the end panels and pulley block and the other one of the control rods passes through another set of aligned rod openings in the end panels and pulley block, and wherein the pulley block has at least one cable routing hole adjacent to each one of the first and second cable guides;
    wherein the first cable is routed from the first louver, around the first vertical pulley, around one of the cable guides and then to one of the control rods, and the second cable is routed from the second louver, around the second vertical pulley, around the other one of the cable guides and then to one of the control rods such that the cables can be selectively routed so that the first and second louvers can be controlled by either one of the two control rods depending on which control rod the respective cable is attached.

2. The ceiling vent assembly of claim 1 wherein the first cable guide is in-line with the second cable guide such the first and second cable guides have a common vertical axis.

3. The ceiling vent assembly of claim 1 wherein the at least one horizontal pulley of the pulley block comprises a pair of horizontal pulleys spaced outwardly from a center of the pulley block, wherein a first of the pair of horizontal pulleys comprises the first cable guide and the second of the pair of horizontal pulleys comprises the second cable guide.

4. The ceiling vent assembly of claim 3 wherein the first of the pair of horizontal pulleys comprises first and second cable guides and the second of the pair of horizontal pulleys comprises first and second cable guides.

5. The ceiling vent assembly of claim 1 wherein each of the control rods is configured to selectively move a respective one of the louvers of the ceiling vent between the open and closed position.

6. The ceiling vent assembly of claim 1 wherein the plurality of aligned pairs of rod openings comprises a first pair of rod openings in a right portion of the end panels, a second pair of rod openings in a left portion of the end panels, and a third pair of rod openings near a midpoint of the end panels.

7. The ceiling vent assembly of claim 1 wherein the pulley block is attached to a mounting bar that spans between one of the pair of end panels or the pair of side panels, and the horizontal pulley is formed in the pulley block so that the horizontal pulley is suspended beneath the mounting bar.

8. The ceiling vent assembly of claim 1 wherein the pulley assembly extends across the frame between the end panels, generally at a mid-point along a width of the frame.

9. The ceiling vent assembly of claim 1 wherein each of the first and second vertical pulleys is mounted to its respective side panel.

10. The ceiling vent assembly of claim 1 wherein the pulley assembly extends across the frame between the side panels, generally at a mid-point along a length of the ceiling vent.

11. The ceiling vent assembly of claim 1 wherein the pulley assembly comprises a mounting bar that is fixed to the side panels.

12. The ceiling vent assembly of claim 11 wherein the first and second vertical pulleys are spaced inwardly from each end of the mounting bar, with the first and second vertical pulleys extending downward from the mounting bar.

13. The ceiling vent assembly of claim 1 wherein when in the closed position, end edges of a louver upper surface are received by shoulder segments in the end panel and the upper surface abuts a bottom of the side panels along an outer edge of the louver.

14. A series of ceiling vents comprising the ceiling vent assembly of claim 1 and a plurality of additional ceiling vents, wherein the pair of control rods extends between the plurality of ceiling vents so that the plurality of ceiling vents can be opened or closed together.

15. The series of ceiling vents of claim 14 wherein the first and second cables are routed in the pulley assemblies such that the first and second louvers of adjacent ceiling vents open and close in an alternating manner.

16. The series of ceiling vents of claim 15 wherein when the first louver is opened and the second louver is closed of one ceiling vent, the first louvers are closed and the second louvers are open of the two adjacent ceiling vents.

17. The series of ceiling vents of claim 14 wherein the first and second cables of each of the ceiling vents are routed in the pulley assemblies such that one control rod controls the first louver on the same side of all the ceiling vents and the other control rod controls the second louver on the opposite side of all the ceiling vents such that all the first louvers open and close together and all the second louvers open and close together.

* * * * *